United States Patent
Harel et al.

(10) Patent No.: US 12,090,493 B2
(45) Date of Patent: Sep. 17, 2024

(54) APPARATUS AND METHOD FOR DRY CLEANING OF POLLUTED FLUE GASES

(71) Applicant: VORTEX ECOLOGIC TECHNOLOGIES LTD, Haifa (IL)

(72) Inventors: Avi Harel, Hod-HaSaron (IL); Moty Yavin, Haifa (IL)

(73) Assignee: VORTEX ECOLOGIC TECHNOLOGIES LTD, Haifa (IL)

( * ) Notice: Subject to any disclaimer, the term of this patent is extended or adjusted under 35 U.S.C. 154(b) by 0 days.

(21) Appl. No.: 17/848,364

(22) Filed: Jun. 23, 2022

(65) Prior Publication Data

US 2023/0012037 A1 Jan. 12, 2023

Related U.S. Application Data

(60) Provisional application No. 63/218,750, filed on Jul. 6, 2021.

(51) Int. Cl.
| | | |
|---|---|---|
| *B01D 45/16* | (2006.01) | |
| *B04C 5/181* | (2006.01) | |
| *B04C 5/185* | (2006.01) | |

(52) U.S. Cl.
CPC .............. *B04C 5/181* (2013.01); *B01D 45/16* (2013.01); *B04C 5/185* (2013.01)

(58) Field of Classification Search
CPC ........... B04C 5/181; B04C 5/185; B04C 5/04; B04C 5/14; B04C 11/00; B01D 45/16; B01D 45/12; B01D 53/24
See application file for complete search history.

(56) References Cited

U.S. PATENT DOCUMENTS 3,232,430 A * 2/1966 Eugene ..................... B07B 7/08
96/372
3,529,724 A * 9/1970 Reed .................... B01D 21/267
210/197

(Continued)

FOREIGN PATENT DOCUMENTS

| CN | 211436626 U | 9/2020 |
|---|---|---|
| CN | 212820529 U | 3/2021 |

(Continued)

OTHER PUBLICATIONS

Intellectual Property Office, Examination Report pertaining to related application filed in GB, Aug. 17, 2023.

(Continued)

*Primary Examiner* — Dung H Bui
(74) *Attorney, Agent, or Firm* — Smith Frohwein Tempel Blaha; Gregory Scott Smith

(57) ABSTRACT

A novel Fine-Particles-Removing Device (FPRD) is disclosed. The FPRD can be used removing fine particles from a flow of gas. Some embodiments of the FPRD can comprise a housing having a peripheral wall, upper and lower extremities wherein the housing comprises at least one inlet opening for receiving the gaseous stream and an inner-ring having a plurality of gaps. The housing can be associated with outlet means for removing of solid contaminants from the housing into a collecting receptacle for collecting the removed solid contaminants from the outlet means. In addition a pressure-manipulating-device (PMD) can be placed between the outlet means and the collecting receptacle.

12 Claims, 5 Drawing Sheets

(56) References Cited

U.S. PATENT DOCUMENTS

| | | | |
|---|---|---|---|
| 3,802,570 A | 4/1974 | Dehne | |
| 4,023,942 A * | 5/1977 | Brady | B01D 47/10 |
| | | | 261/DIG. 54 |
| 4,789,476 A * | 12/1988 | Schulz | B04C 5/181 |
| | | | 55/459.1 |
| 4,810,264 A * | 3/1989 | Dewitz | B04C 5/103 |
| | | | 210/512.3 |
| 5,071,542 A * | 12/1991 | Tuszko | B04C 5/103 |
| | | | 55/459.1 |
| 5,391,294 A * | 2/1995 | Mercier | B04C 5/22 |
| | | | 210/195.3 |
| 6,270,544 B1 * | 8/2001 | Mencher | B01D 53/78 |
| | | | 55/455 |
| 7,056,366 B2 | 6/2006 | Fichman et al. | |
| 7,713,491 B2 * | 5/2010 | Claude | B01J 8/0055 |
| | | | 95/271 |
| 7,780,932 B2 | 8/2010 | Canari et al. | |
| 8,524,180 B2 | 9/2013 | Canari et al. | |
| 8,578,628 B2 * | 11/2013 | Coles | B04C 5/181 |
| | | | 210/512.3 |
| 9,022,231 B1 * | 5/2015 | Ford | B04C 5/107 |
| | | | 210/512.1 |
| 10,213,794 B1 * | 2/2019 | Miller | B04C 5/14 |
| 2006/0070362 A1 * | 4/2006 | Dewitz | B01D 45/16 |
| | | | 55/456 |
| 2006/0130448 A1 * | 6/2006 | Han | A47L 9/1666 |
| | | | 55/434.2 |
| 2009/0166358 A1 * | 7/2009 | Bose | B01D 53/24 |
| | | | 220/88.3 |
| 2010/0065669 A1 * | 3/2010 | Coles | B04C 5/081 |
| | | | 241/39 |
| 2010/0139492 A1 | 6/2010 | Fichman et al. | |
| 2011/0294643 A1 * | 12/2011 | Ford | B04C 5/107 |
| | | | 494/56 |
| 2012/0036832 A1 * | 2/2012 | Hoy-Petersen | F01N 3/04 |
| | | | 60/274 |
| 2012/0107189 A1 * | 5/2012 | Yang | B04C 5/103 |
| | | | 55/474 |
| 2015/0328571 A1 * | 11/2015 | Son | B04C 3/06 |
| | | | 55/418 |
| 2019/0022585 A1 * | 1/2019 | Patrick | B01D 59/20 |

FOREIGN PATENT DOCUMENTS

| | | |
|---|---|---|
| GB | 2076335 | 12/1981 |
| JP | 2016019953 A | 2/2016 |
| WO | 198605417 A1 | 9/1986 |
| WO | 2017036970 A1 | 3/2017 |

OTHER PUBLICATIONS

Enhancing the Performance of Fibrous Filters by Means of Acoustic Waves, L. Moldavsky, M. Fichman and C. Gutfinger Aerosol Research Laboratory, Faculty of Mechanical Engineering Technion—Israel Institute of Technology, Haifa 32000, Israel Jun. 21, 2005.

* cited by examiner

APPARATUS AND METHOD FOR DRY CLEANING OF POLLUTED FLUE GASES

CROSS REFERENCE TO RELATED PATENT APPLICATIONS

This utility patent application being filed in the United States as a non-provisional application for patent under Title 35 U.S.C. § 100 et seq. and 37 C.F.R. § 1.53(b) and, claiming the benefit of the prior filing date under Title 35, U.S.C. § 119(e) of the United States provisional application for patent that was filed on Jul. 6, 2021 and assigned the Ser. No. 63/218,750, which application is herein incorporated by reference in its entirety. In addition this application is related to U.S. Pat. Nos. 7,056,366; 8,524,180; and 7,780,932, the content of each one of those documents is incorporate by reference.

FIELD OF THE DISCLOSURE

The present disclosure relates to the field of dry dusty gas filtration. More specifically, the present disclosure refers to a Fine-Particles-Removing Device (FPRD) to be used in separating solid contaminants from flue gases.

BACKGROUND

Cyclone separators are widely used in industry for dry and wet cleaning of polluted air and can be generally divided into two groups. The first group can be referred as wet filtering. The wet filtering is based on conveying tangential motion to fluid entering a cleaning vessel and separation of the solid particles therefrom by centrifugal force.

The second group can be referred as dry filtering. Dry filtering is based on filtration of the air or any other flue gases without involving fluid within the cleaning vessel. The industrial equipment relevant to this group includes bag filters dry cyclone and electrostatic precipitators.

The main factor affecting the separation of solid contaminants from flue gases in cyclone separators is the velocity of the gaseous phase or its radial acceleration which is a function of the tangential velocity and the radius. Two main forces affect a particle moving in a rotating flow. These forces are a centrifugal force and a drag force along the line of flow. The centrifugal force, $F_c$, is proportional to the particle mass $m_p$ and to the square of the tangential velocity, $V_t$, of the particle or of the spinning gas, which are almost the same, and is inversely proportional to the radius of curvature, r, of the particle trajectory according to the formula:

$$F_c = m_p V_t^2 / r \quad (1)$$

The velocity of the spinning gas flow is assumed to have only a tangential component, and this type of flow is usually of the form:

$$V_t r^n = \text{const} \quad (2)$$

(wherein 'n' depends on the fluid regime)

Typical velocities in high efficiency cyclones are about 15-20 m/sec. These velocities were found to be insufficient for removing fine particles of dust, which are 20 microns or less.

The filtration is improved by adding a liquid to the cyclone separator, for removing fine dust and especially for separating gaseous contaminants such as sulfur dioxide from a gaseous stream such as flue gas. However, the solution of adding a liquid to the cyclone separator cannot be used in places that require dry gas cleaning. Therefore there is a need for a new and improved device which will ensure efficient dry removal of solid and gaseous contaminants.

A common dry cleaning cyclone unit comprises a housing defined by a peripheral wall and by upper and lower extremities. The peripheral wall can be cylindrical or having the shape of Archimedean spiral. The housing may have at least one inlet opening for receiving the gaseous stream and outlet means from the housing. An example of outlet means may have a form of a hollow truncated cone having a large base (near the housing) and a small base (at the far end from the housing). In some embodiments of a common dry cleaning cyclone unit a pipe is placed within the housing wherein an uppermost extremity of the pipe is located outside of the housing, and lowermost extremity of said pipe is located within the housing close to the large base of the hollow truncated cone.

In addition, some cyclone units may comprise an inner-ring being mounted within the housing, coaxially with the longitudinal axis so as to provide an annular space between the housing central wall and the peripheral wall of the inner-ring and to provide an inner annular space between the central wall of the inner-ring and the lowermost extremity of said pipe. The shape of the inner-ring can be cylindrical, depending on the shape of the housing. The inner-ring is associated with a plurality of gaps that are configured to enable passage from the annular space towards the inner annular space. Each gap can be characterized by it's shape and size.

Using such a cyclone unit, which is described above, the gaseous stream enters through at least one of the inlet openings to said annular space and then passes through at least one of said plurality of gaps in the inner-ring towards said inner annular space, and from there flow through said hollow truncated cone whereas said gaseous product is exiting though said pipe, while the dust is collected through said small-base-of-hollow-truncated-cone (SBHTC) into an appropriate collecting receptacle, a bunker for example.

However, as it is mentioned above, the size of particles that can be collected, with high efficiency, by a dry cyclone separator are quite big, 20 microns or more. Therefore there is a need for a new Fine-Particles-Removing Device (FPRD) which will ensure efficient (more than 90% efficiency) dry removal of solid particles having the size of 10 microns or less.

BRIEF SUMMARY

The needs and the deficiencies that are described above are not intended to limit the scope of the inventive concepts of the present disclosure in any manner. The needs are presented for illustration only. The disclosure is directed to a novel apparatus and method for dry cleaning of polluted flue gases.

We found that there is an under-pressure in the exit of the SBHTC toward the collecting receptacle. This under-pressure causes fine particles to rise upward instead of traveling toward the collecting receptacle. In some cases this under-pressure may draw fine particles from the collecting receptacle. Further, those fine particles can float in the space near the SBHTC.

We found that adding a pressure-manipulating-device (PMD) between the SBHTC and the collecting receptacle overcomes the under-pressure situation in the exit of the SBHTC. Several examples of PMDs were tested. Devices such as but not limited to caps, inverse cones, pyramids with different number of sides (six, eight sides for example), etc.

In addition few heights per each device were tested. Furthermore we tried devices with holes (perforated), wherein the holes in the devices were in different diameters. Some of the devices have truncated apex, wherein the apex of each device was cut in radiuses that differs from radius of other devices, etc.

We found that a PMD that comprises an inverse-perforated-cone (IPC) having a truncated apex gives better results than other PMDs. Such a PMD turns the gas-dust flow toward the walls of the bunker while the dust sediments reside in the bunker. The apex of the inverse perforated cone can be placed at a distance of 'D' centimeters from the surface of the SBHTC. We found that when 'D' is in the range of 0.3 to 0.6 of the length of the diameter of the SBHTC the removing of fine particles is more efficient. The term invers in IPC is used to indicate that the cone of the PMD is inverse to the cone of the SBHTC.

An example of the IPC can be made of perforated plate. The radius of the base of an example IPC can be similar to the radius of the SBHTC. While the height of the example IPC can be in the range of 1.0 to 1.2 of the length of the diameter of the SBHTC. The arrangement of the holes in the perforated plate can be in a shape of a chessboard pattern. The dimension of the holes in the perforated plate can be in the range of 6 to 10 mm, 8 mm for example. The distance between holes can be in the range of 6 to 10 mm, 8 mm for example.

We found that flow of gas passing around the IPC pushes the fine particles away from the exit of the SBHTC toward the collecting receptacle or towards the wall of the collecting receptacle where the particles settle and can be collected.

In order to place the IPC in an optimal location in relation to the SBHTC we run several trials in which we moved the IPC toward or away from the SBHTC looking for a location in which the removing of the fine particles is optimal. By moving the IPC toward or away from the SBHTC the value of D is changed in order to find the best location of the IPC.

The foregoing summary is not intended to summarize each potential embodiment or every aspect of the present invention, and other features and advantages of the present invention will become apparent upon reading the following detailed description of the embodiments with the accompanying drawings and appended claims.

Furthermore, although specific embodiments are described in detail to illustrate the inventive concepts to a person skilled in the art, such embodiments can be modified to various modifications and alternative forms. Accordingly, the figures and written description are not intended to limit the scope of the inventive concepts in any manner.

Other objects, features, and advantages of the present invention will become apparent upon reading the following detailed description of the embodiments with the accompanying drawings and appended claims.

BRIEF DESCRIPTION OF THE DRAWINGS

Examples of embodiments of the present disclosure will be understood and appreciated more fully from the following detailed description, taken in conjunction with the drawings in which.

DETAILED DESCRIPTION OF SOME EXAMPLE EMBODIMENTS

Turning now to the figures in which like numerals represent like elements throughout the several views, of embodiments of the present disclosure that are described. For convenience, only some elements of the same group may be labeled with numerals.

The purpose of the drawings is to describe examples of embodiments and not for production purpose. Therefore, features shown in the figures are chosen for convenience and clarity of presentation only and are not necessarily shown to scale. Moreover, the language used in this disclosure has been principally selected for readability and instructional purposes, and may not have been selected to define or limit the inventive subject matter.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. Moreover, the language used in this disclosure has been principally selected for readability and instructional purposes, and may not have been selected to delineate or circumscribe the inventive subject matter, resort to the claims being necessary to determine such inventive subject matter.

Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
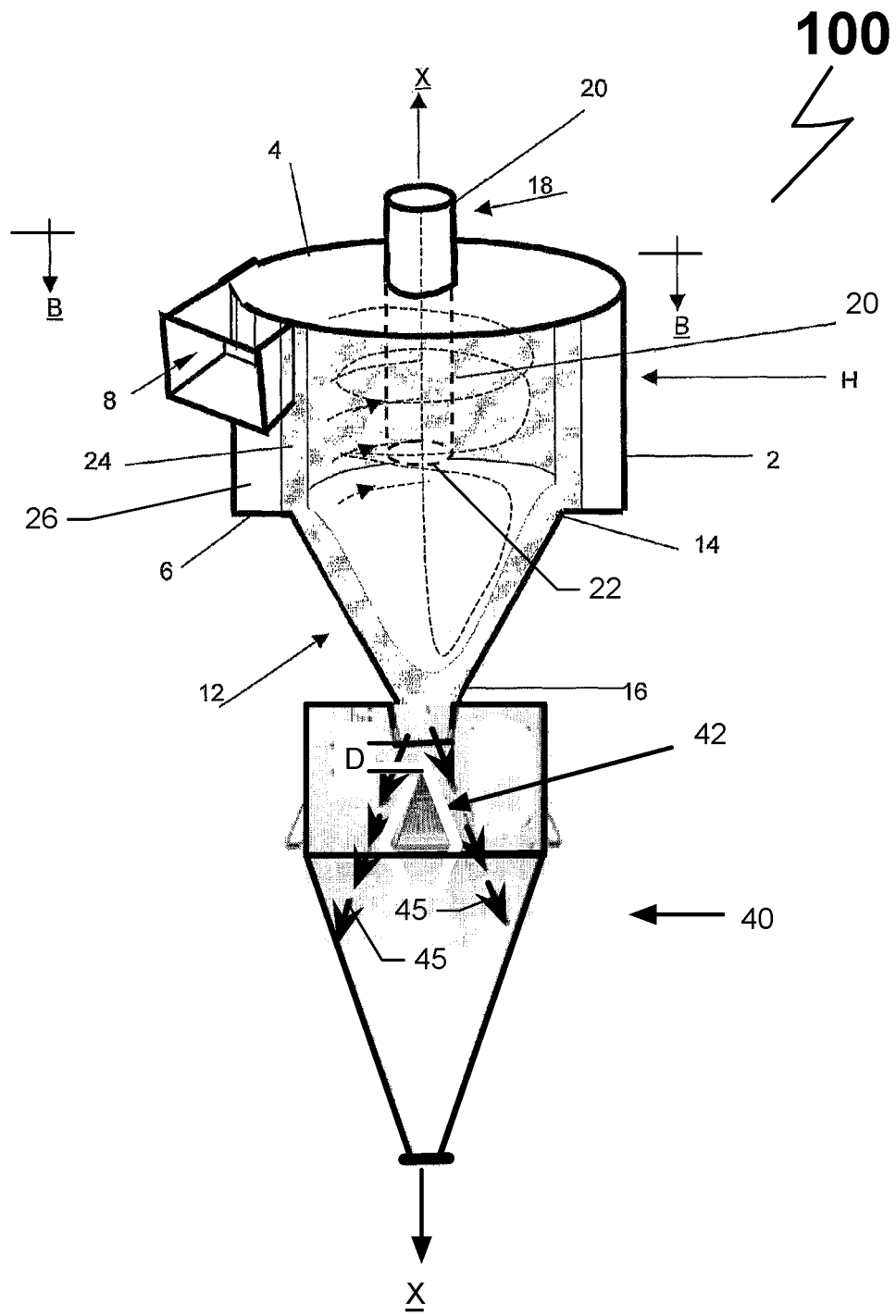
FIG. 1 shows a schematic presentation of an example embodiment of FPRD according to the present disclosure.
Figure 2:
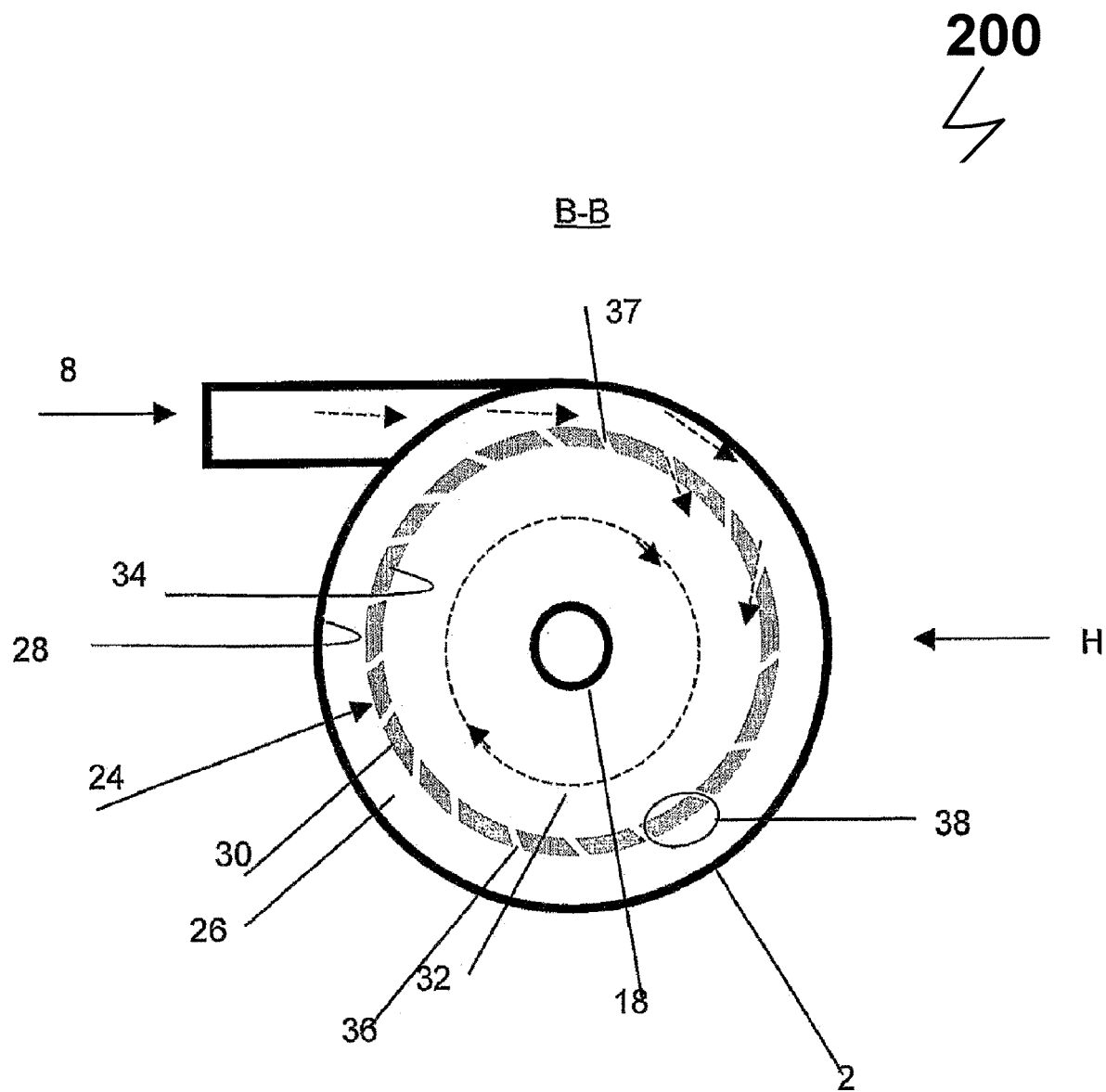
FIG. 2 shows a cross-sectional view of an example of a housing taken along B-B.

FIG. 1 and FIG. 2 illustrate schematic representation of an example of FPRD 100. FPRD 100 may comprise a housing (H) defined by a cylindrical peripheral wall (2) and by upper (4) and lower (6) extremities. In some embodiments the housing may have a shape of Archimedean spiral (not showing in the figures). An example of housing 'H' may have a longitudinal axis (X-X), one or more inlet opening (8) for receiving gaseous stream. In addition the example of housing 'H' may have an outlet means formed as a hollow truncated cone (12), having a large base (14) and a spaced apart a small-base-of-hollow-truncated-cone (SBHTC) (16). The large base (14) is associated with the lower extremity (6) of housing (H).

In some embodiments of the disclosed technique a pipe (18) is placed within said housing (H). The pip (18) can be placed coaxially with the longitudinal axis (X-X) wherein an uppermost extremity (20) of the pipe (18) is located outside of the housing, and a lowermost extremity (22) of the pipe

(18) is located within the housing (H). In other embodiments the pipe does not penetrate to the housing (H).

Housing 'H' may further comprise an inner-ring (24 FIG. 2). An example of inner-ring (24) can be mounted coaxially with the longitudinal axis (X-X) and provides an annular space (26 FIG. 2) between the housing central wall (28 FIG. 2) and the peripheral wall of the inner-ring (30 FIG. 2) and to provide an inner annular space (32 FIG. 2) between the central wall (34 FIG. 2) of the inner-ring (24 FIG. 2) and the lowermost extremity (22 FIG. 1) of the penetrated pipe (18).

The shape of the inner-ring (24) can be cylindrical. The inner-ring (24) can be associated with a plurality of gaps (36) that are configured to enable passage from the annular space (26) towards the inner annular space (32). Each gap (36) can be characterized by it's shape and size. The shape and size of each gap (36) is designed to enforce the gaseous stream received via the one or more inlet opening (8) and rotated in the annular space (26) to pass via the gaps (36) in the inner-ring (24) and to generate an artificial tornado in the inner annular space (32).

The artificial tornado, in the inner annular space (32), can achieve good separation between the gas phase and the particles at the area of the hollow truncated cone (12 FIG. 1). The separation can be achieved by the difference between the motion of the gas and the motion of the particles. The gaseous product can be exiting via the lowermost extremity (22 FIG. 1) of the pipe (18 FIG. 1) while the dust and particles are collected through the small-base-of-hollow-truncated-cone (SBHTC) (16 FIG. 1) into a collecting receptacle (40 FIG. 1).

In some example embodiments of FPRD 100 the upper section of the collecting receptacle (40 FIG. 1) may comprise a pressure-manipulating-device (PMD) (42 FIG. 1). An example of PMD (42) can comprises an inverse-perforated-cone (IPC) having a truncated apex. The apex of the inverse perforated cone can be placed at a distance of 'D' centimeters below the surface of the SBHTC (16 FIG. 1). We found that when 'D' is in the range of 0.3 to 0.6 of the length of the diameter of the SBHTC (16) the removing of fine particles is more efficient. Such a PMD (42 FIG. 1) turns the gas-dust flow toward the walls of the bunker, as illustrated by arrows (45 FIG. 1) while the dust sediments reside in the bunker.

Figure 3:
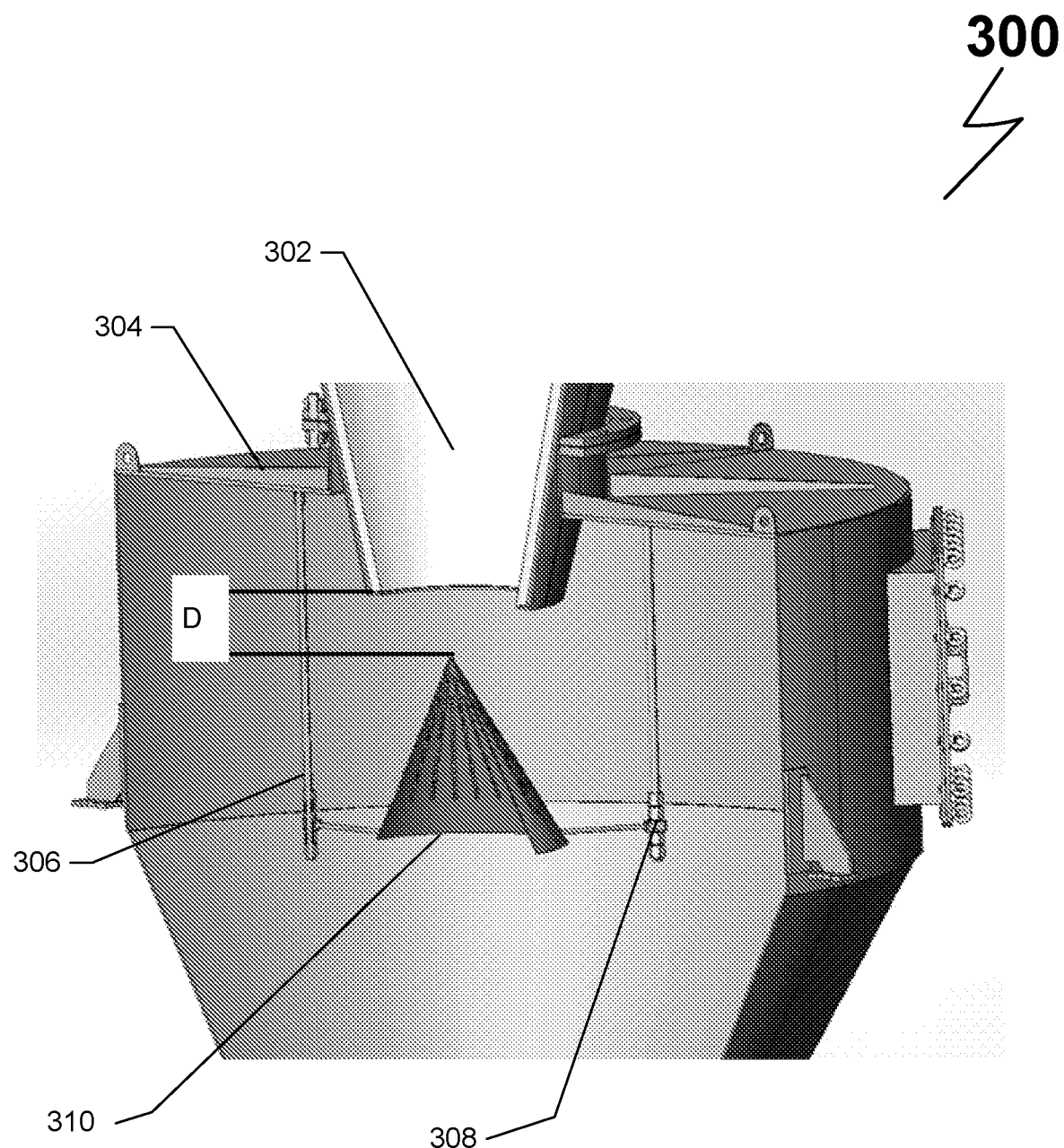
FIG. 3 shows a cross-sectional view of an upper section of a bunker that comprises an example of a pressure-manipulating-device (PMD)

Referring now to FIG. 3 that illustrates a cross-sectional view 300 of an upper section of a bunker (40 FIG. 1) that comprises an example of a pressure-manipulating-device (PMD) (310). PMD (310) can be associated to the upper extremity (304) of the upper section of a bunker (40) by two or more long screws (306). Associating the PMD (310) to the long screws can be done by adjusting mechanism (308), which enables the movement of PMD (310) up toward the small-base-of-hollow-truncated-cone (SBHTC) (302) or down, away from the SBHTC (302).

In order to place the PMD (310) in an optimal location in relation to the SBHTC (302) we run several trials in which we moved the PMD (310) along the screws (306) toward or away from the SBHTC (302) looking for a location in which the removing of the fine particles is optimal. By moving the PMD (310) toward or away from the SBHTC (302), the value of D is changed. We found that when 'D' is in the range of 0.3 to 0.6 of the length of the diameter of the SBHTC (302) the removing of fine particles has high efficiency, more than 90% efficiency.

In order to find the PMD (310) that gives the best results we tested several devices. Devices such as but not limited to caps, inverse cones, pyramids with different number of sides (six, eight sides for example), etc. In addition few heights per each device were tested. Furthermore we tried devices with holes (perforated), wherein the holes in the devices were in different diameters. Some of the devices have truncated apex, wherein the apex of each device was cut in radiuses that differs from radius of other devices, etc.

Figure 4:
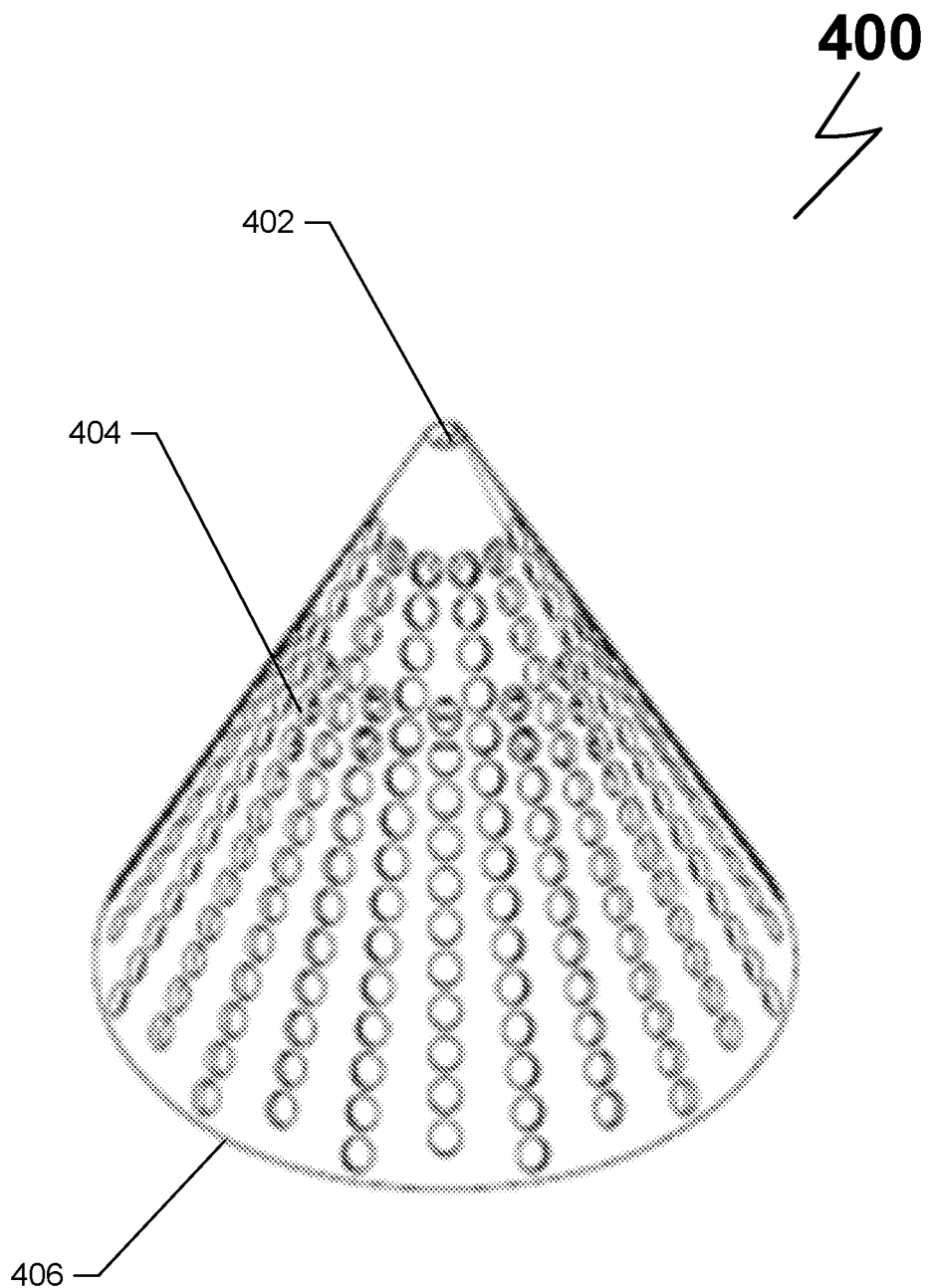
FIG. 4 shows a view of an example of an inverse-perforated-cone (IPC)

We found that PMD (310) that comprises an inverse-perforated-cone (IPC) (400 FIG. 4) having a truncated apex, as illustrated in FIG. 4 gives better results than other PMDs. The term invers in IPC (400) is used to indicate that the cone of the IPC is inverse to the cone of the SBHTC (302) (FIG. 3). An example of the IPC (400) can be made of perforated plate. The radius of the base (406) of the example IPC (400) can be similar to the radius of the SBHTC (302) (FIG. 3). While the height of the example IPC can be in the range of 1.0 to 1.2 of the length of the diameter of the SBHTC (302) (FIG. 3). The arrangement of the holes (404) in the perforated plate can be in a shape of a chessboard pattern. The dimension of the holes (404) in the perforated plate can be in the range of 6 to 10 mm, 8 mm for example. The distance between holes can be in the range of 6 to 10 mm. for example 8 mm.

Figure 5:
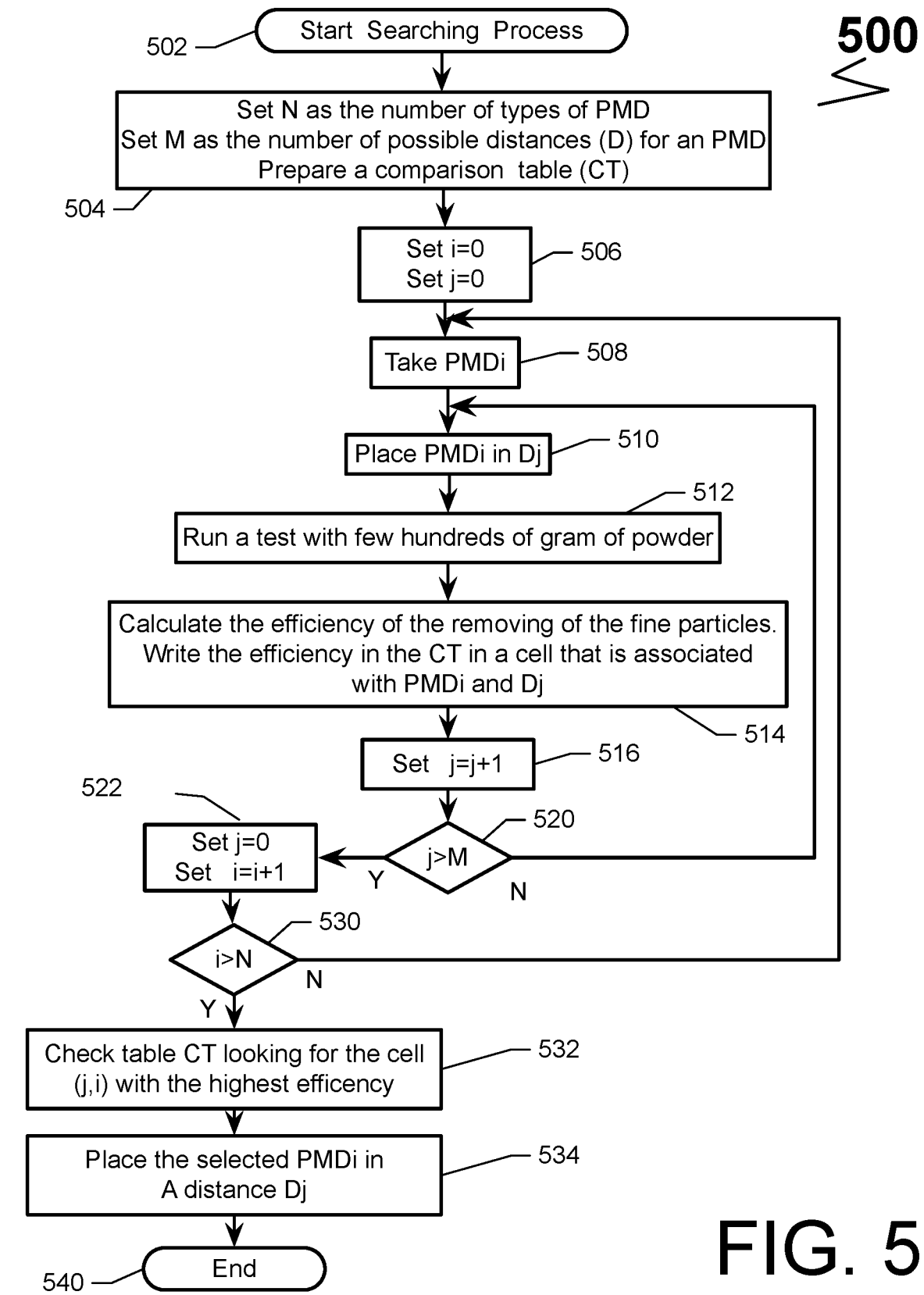
FIG. 5 shows a flowchart showing relevant actions of an example of a process that can be implemented for searching for a PMD and its location in an example of FPRD.

FIG. 5 illustrates a flowchart showing relevant actions of process (500), which can be used for searching a PMD (42 FIG. 1) and its location (D FIG. 1) of FPRD (100 FIG. 1). An example of a searching process (500) can be initiated (502) by organizing (504) 'N' types of PMD that can be used in FPRD 100. 'N' can be an integer number that is equal to the number of PMDs to be tested. 'N' can be in the range of two to twenty types, eight types for example. Examples of types of PMD (42 FIG. 1) may comprise caps, inverse cones, pyramids with different number of sides (six, eight sides for example), etc. In addition few heights per each type of PMD can be tested. Furthermore, we tested PMDs with holes (perforated), wherein the holes in the devices were in different diameters. Some of the PMDs have truncated apex, wherein the apex of each PMD was cut in radiuses that differs from radius of other PMDs, etc.

The number 'M' of distances that were tested 504 can be an integer number between two to six, four distances for example, The distance 'D' is the distance between the apex of the tested PMD (310 FIG. 3) from the surface of the SBHTC (302 FIG. 3) measured in centimeters. In the example process (500) four distances were tested. The distances were: 0.3; 0.4; 0.5; and 0.6 of the length of the diameter of the SBHTC. Other examples of process (500) may use other number of distances and other values of distances.

In addition, at block (504) a comparison table (CT) can be prepared. An example of CT may comprise 'N' columns, one per each tested PMD and 'M' lines, one per each distance 'D'. Each cell in the table will comprise the calculated efficiency for PMDi located at Dj.

Next at block (506) the value of 'i' and the value of 'j' can be set to zero. Next, at block (508) the PMD which was appointed as PMDi can be fetched and be placed (510) it in a distance Dj. Setting the distance Dj can be done by using the adjusting mechanism 308 (FIG. 3). Next, we activated (512) the FPRD (100 FIG. 1) and run a test for a period of 60 to 180 seconds, 120 seconds for example. During the test, few hundreds of grams, between 200 to 600 grams for example, of powder can be inserted into the gaseous stream at inlet opening (8 FIG. 1). The powder may comply with ISO 12103-1 A2 Fine.

After the period of the test we stopped the FPRD (100 FIG. 1) and we collected the powder from the collecting receptacle (40 FIG. 1). The collected powder can be weighted and be divided by the value of the inserted powder in order to calculate the efficiency (514) of the FPRD in the configuration of PMDi in a Dj. The value of the calculated efficiency Eij can be written (514) in the appropriate cell of CT.

Next, at block (516) the value of 'j' is incremented by one and a decision is made (520) whether the new value of 'j' is bigger than the value of 'M'. If (520) the new value of 'j' is not bigger than 'M', then process (500) returns to block (510) for placing PMDi in the new distance Dj. If (520) the value of 'j' is bigger than the value of 'M', then at block (522) the value of 'j' is set to zero and the value of 'i' is incremented by one.

At block (530) a decision is made whether the value of 'i' is bigger than 'N'. If (530) the new value of 'i' is not bigger than the value of 'N', then process (500) returns to block (508) for handling the next PMD, which is associated with the new value of 'i'. If (530) the new value of 'i' is bigger than the value of 'N', then process (500) proceed to block (532) in which the CT is searched looking for the cell with the highest efficiency (Eij). This cell defines the best configuration of FPRD (100 FIG. 1) in which PMDi, is placed in Dj. Thus, at block (534) we placed PMDi in a distance of Dj and process (500) can be terminated (540).

After executing process (500) we found that a PMD, which comprises an inverse-perforated-cone (IPC) having a truncated apex gives better results than other PMDs that we checked. In addition, we found that when placing the IPC in a distance of 0.4 of the length of the diameter of the SBHTC gives better results than other distances.

In this disclosure the words "module," "device," "component," "element" and "unit" may be used interchangeably. Anything designated module may be a stand-alone module or a specialized module. A module may be modular or have modular aspects allowing it to be easily removed and replaced with another similar module.

In the description and claims of the present disclosure, the terms "comprise," "include," "have," and conjugates thereof are used to indicate that the object or objects of the verb are not necessarily a complete listing of members, components, elements, or parts of the subject or subjects of the verb.

It will be appreciated that the above-described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure may be implemented by combination of features and elements that have been described in association to different embodiments along the discloser.

It is to be understood that the above description is intended to be illustrative, and not restrictive. For example, the above-described embodiments may be used in combination with each other. Many other embodiments will be apparent to those of skill in the art upon reviewing the above description.

The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A Fine-Particles-Removing Device (FPRD) comprising:
a housing defined by a peripheral wall and by upper and lower extremities, wherein the housing comprises at least one inlet opening configured to receive a gaseous stream and an inner-ring having a plurality of gaps angled relative to a direction of flow to force the gaseous stream to rotate in the form of an artificial tornado and wherein the lower extremity has a diameter;
a hollow truncated cone that is associated with the lower extremity of the housing;
a bunker that is associated with the lower extremity of the hollow truncated cone, the bunker being configured to collect solid contaminants falling from the hollow truncated cone; and
a pressure-manipulating-device (PMD) that is placed inside the bunker at a distance "D" below the hollow truncated cone; and
wherein the PMD is associated with an upper extremity of an upper section of the bunker by two or more long screws enabling the PMD to be adjusted such that a top of the PMD is a distance "D" below the hollow truncated cone.

2. The FPRD of claim 1, wherein the two or more long screws are configured to adjust the distance that the top of the PMD is below the lower extremity of the housing to be in the range of 0.3 and 0.6 of the diameter of the lower extremity.

3. The FPRD of claim 1, wherein the peripheral wall of the housing is cylindrical.

4. The FPRD of claim 1, wherein the peripheral wall of the housing has the shape of Archimedean spiral.

5. The FPRD of claim 1, further comprising a pipe that is associated with the housing and wherein an uppermost extremity of the pipe is located outside of the housing.

6. The FPRD of claim 5, wherein the lowermost extremity of the pipe is located within the housing and close to the outlet means.

7. The FPRD of claim 1, wherein the PMD has a shape of an inverse cone.

8. The FPRD of claim 7, wherein the PMD has a shape of an inverse-cone having a truncated apex.

9. The FPRD of claim 7, wherein the PMD has a shape of an inverse-cone having a perforated surface, wherein the perforations range from 6 to 10 mm in diameter.

10. The FPRD of claim 1, wherein the outlet means for removing of solid contaminants from the housing, comprising a hollow truncated cone having a large base associated with the lower extremity of the housing and a spaced apart small-base-of-hollow-truncated cone (SBHTC).

11. The FPRD of claim 10, wherein the PMD is maintained at an optimal distance 'D' below the hollow truncated cone of the collecting receptacle.

12. The FPRD of claim 10, wherein the radius of the base of an inverse perforated cone (IPC) of the PMD is similar to the radius of the SBHTC.

* * * * *